United States Patent [19]

Haralson

[11] Patent Number: 4,876,812

[45] Date of Patent: Oct. 31, 1989

[54] EMERGENCY CAR CALL KIT

[76] Inventor: Katherine Haralson, 4617 Ledge Ave., Toluca Lake, Calif. 91602

[21] Appl. No.: 191,199

[22] Filed: May 6, 1988

[51] Int. Cl.$^4$ ............................................. G09F 21/04
[52] U.S. Cl. ........................................ 40/592; 40/600; 40/606; 40/618; 40/621
[58] Field of Search ............... 40/592, 597, 600, 591, 40/618, 621, 610, 607, 606, 611, 595, 620; 434/168, 171, 172; 206/425; 248/537

[56] References Cited

U.S. PATENT DOCUMENTS

| | | | |
|---|---|---|---|
| 1,207,711 | 12/1916 | Clark | 40/620 |
| 2,922,234 | 1/1960 | Patterson | 434/172 |
| 3,148,856 | 9/1964 | Orlando | 40/597 |
| 3,228,133 | 1/1966 | Baermann | 40/621 |
| 3,535,807 | 10/1970 | Baldwin | 40/618 |
| 3,874,103 | 4/1975 | Muta | 40/607 |
| 4,059,915 | 11/1977 | Owens | 40/610 |
| 4,108,311 | 8/1978 | McClendon | 206/803 |
| 4,138,787 | 2/1979 | Sarkisian et al. | 40/618 |
| 4,456,126 | 6/1984 | Hicks, Jr. | 40/591 |
| 4,700,655 | 10/1987 | Kirby | 248/537 |

Primary Examiner—Gene Mancene
Assistant Examiner—Cary E. Stone
Attorney, Agent, or Firm—Beehler, Pavitt, Siegemund, Jagger, Martella & Dawes

[57] ABSTRACT

For emergency use on a highway there is provided a kit containing a collection of parts in disassembled state but ready for assembly within the confines of a small space no larger than the interior of a conventional automobile and then mounted for visual inspection on the exterior. The kit is one comprising a post for supporting a relatively large signboard. The signboard in turn is provided with aligned spaces for reception of individual letters and numbers selected from a reservoir of multiple letters and numbers to spell out a message visible by passerby.

2 Claims, 1 Drawing Sheet

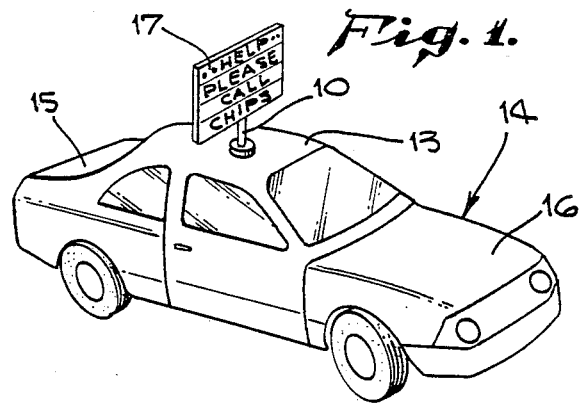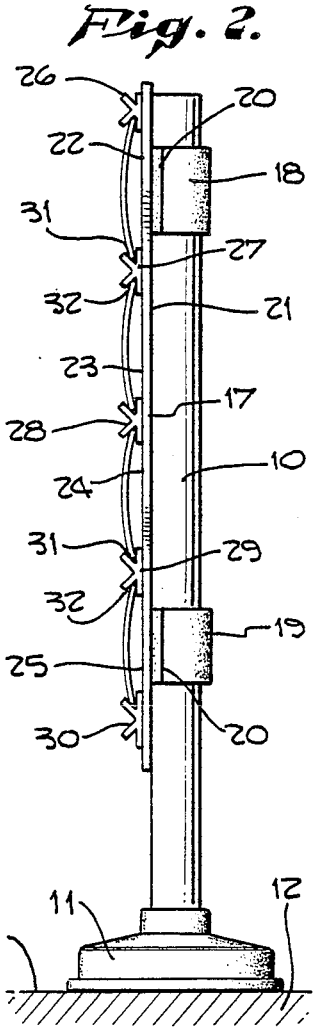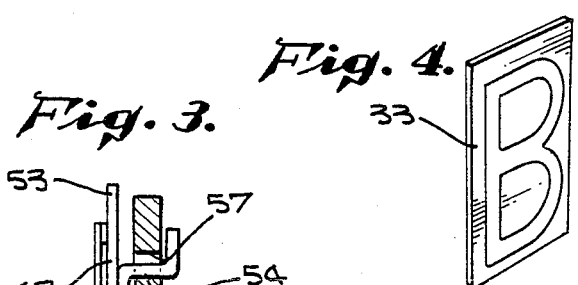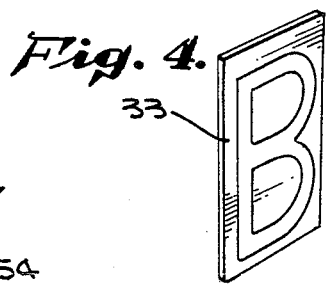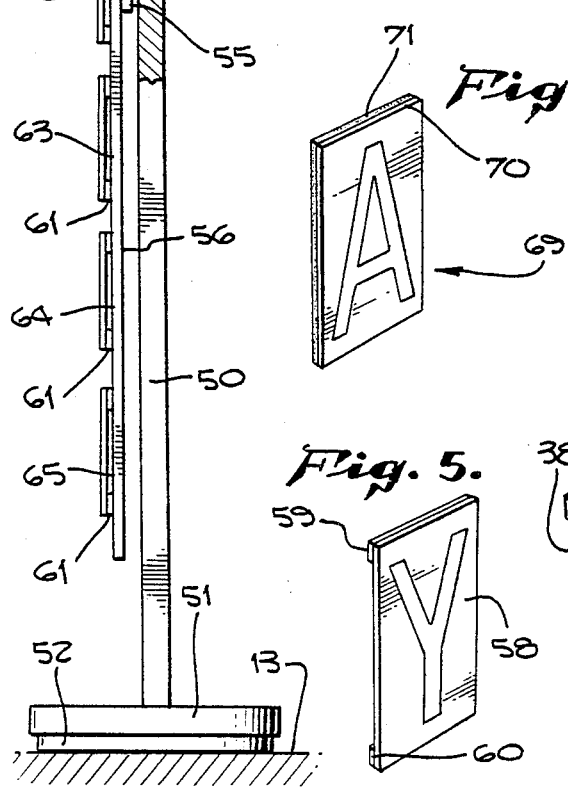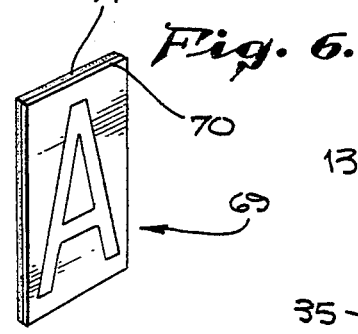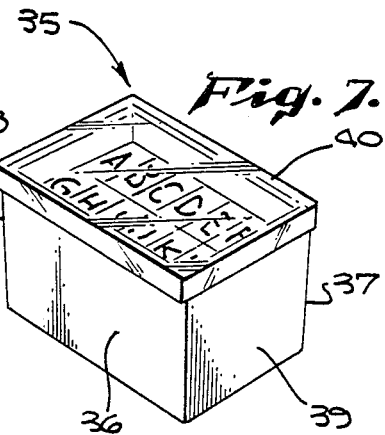

EMERGENCY CAR CALL KIT

The invention has reference to a changeable sign of simple character which can be set up at will by the occupant without stepping outside of the vehicle and with equal ease placed on the exterior of the vehicle in a position easily read by passing traffic, as a call for assistance of some kind.

It is the common experience of most individuals, at some time or other, to drive relatively long distances to some selected destination. A driving chore of such character is applicable to virtually all types of individuals, some of whom may be persons of exceptional competence and many of whom may be persons of no more than modest competence and ability with respect to the handling of very simple items of equipment. On the highway there is always the likelihood of a mechanical failure of some kind which would hamper the ability of the motorist to reach a selected destination.

As a partial solution of such needs, in some areas of the country, and particularly large metropolitan areas, an established emergency number has been provided to be called on the telephone to summon needed assistance on short notice. To be useful, however, such an emergency number necessitates access to a telephone and such a telephone might not be within easy reach. To remedy a deficiency of that type, resort can be had to a citizen's band radio in many localities. Even though an emergency number may be available to the possessor of a citizen's band radio set, whoever is to operate such a set must be familar with its operation enough to be able to use it acceptably and quickly under circumstances which might be disadvantageous. Many motorists are clearly either not of a disposition to operate such equipment or may be a person finding such equipment unnecessarily expensive. Further still, even under circumstances where a person or family might have two or more automobiles available, it is almost invariably inconvenient to have good usable equipment in all of them. Most average families in fact never have a car phone, citizen's band radio or other emergency equipment. Further still, gas stations are often on a "do it yourself" routine where the customer, however inexperienced, may, for example, be compelled to do chores such as change his own tire. This is more likely to occur after a 5:00 p.m. closing time, leaving the customer at a special disadvantage.

It is therefore among the objects of the invention to provide a new and improved emergency kit which can be conveniently stored in virtually any automobile and of a nature which can be easily and successfully handled by an inexperienced person and equally readily located in view where it can be seen by prospective help.

Another object of the invention is to provide a new and improved emergency kit of simple, easily handled character which needs only a minimum of instructions to be set up and the parts of which are of such character as to be virtually self-explanatory.

Still another object of the invention is to provide a new and improved emergency kit of an easily handable character which, once located on the vehicle for inspection by prospective help, is readily visible, making a lasting enough impression so that it can be read by a moving vehicle, the impression being one having good prospect of being easily remembered until some appropriate action can be taken.

Still another object of the invention is to provide a new and improved emergency kit for use on an automotive vehicle on the highway wherein the language of a call for assistance can be readily selected and spelled out and then with equal ease set up on a visible background, which in turn is readily mountable in full view on the vehicle.

A further object of the invention is to provide a new and improved emergency kit for automotive use which is easily stowed in such space as might be available in a conventional passenger car and with respect to which there is ready access to the kit and its contents.

Further included among the objects of the invention is to provide a new and improved vehicle emergency kit for use in conventional automobiles which is relatively inexpensive, easily manipulated and within the financial reach of virtually any cautious motorist.

While these and other objects in view, the invention consists of the construction, arrangements, and combination of the various parts of the device serving as an example only of one or more embodiments of the invention, whereby the objects contemplated are attained, as hereinafter disclosed in the specification and drawings, and pointed out in the appended claims.

IN THE DRAWINGS

FIG. 1 is a side perspective view of a typical automotive vehicle showing the invention in use.

FIG. 2 is a side elevational view of one form of the device set up for inspection.

FIG. 3 is a side elevational view of another form of the device set up for inspection.

FIG. 4 is a side elevational view of characters of a type usable with FIG. 2.

FIG. 5 is a side elevational view of a character of the type usable in the embodiment of FIG. 3.

FIG. 6 is a side elevational view of a character of the type usable on a plain surface background.

FIG. 7 is a side elevational view of a typical package for storing the characters of one or another of the embodiments.

In an embodiment of the invention chosen for the purpose of illustration, there is shown in FIG. 1 a post 10 mounted upon a base 11 of a type suited for support upon a section of sheet material 12 which may, for example, be a top surface 13 of a conventional automobile 14 but which could, as readily, be the top surface of a trunk compartment 15 or hood 16. For convenience in storing, it may be preferable to have the post 10 separable from the base 11.

In the embodiment of FIG. 2, there is a rectangular section of sheet material 17 having an upper bracket 18 and a lower bracket 19 for sliding reception of the post 10. By selecting a somewhat yieldable material for the bracket, a firm sliding fit may be provided so that during use, the sheet material will remain erect on the post but which for storage may provide for release of the post. Flanges 20 on the brackets are adapted to be permanently fastened to a rear face 21 of the sheet material 17 by some appropriate means such as an adequate adhesive or appropriate conventional riveting.

A front face of the sheet material 17 is shown divided into four display panels, panels 22, 23, 24 and 25. Separating the display panels are retention clips 26, 27, 28, 29 and 30. Retention clips provide oppositely facing grooves 31 and 32 in each instance. The grooves are for retention of removable, uniformly sized, plaque-like members 33 such, for example, as the member of FIG. 4 which is indicative of the character of the alphabet letter B. The height of each plaque-like member is made such as to fit slidably between oppositely facing grooves 31 and 32 on adjacent retention clips. It is, moreover, preferable to have the width of all of the plaque-like members uniform, irrespective of the character it may bear, whether it be a letter of the alphabet or any one of the numerals from one to zero. The character itself may vary in its width, irrespective of the width of the plaque-like member.

Interest resides primarily in ease of setting up readable letters on display, whether or not they may chance to have a uniformly spaced eye appeal. The importance resides in making the plaque-like members easy to handle, easy to install, to spell out the necessary information, as well as being easy to store.

When not in use, the plaque-like members 33 may be stored in a container 35 made up of top and bottom elements 36 and 37 which are relatively long, serving with side elements 38 and 39 which also are relatively long. It is also preferable to have the container 35 provided with a transparent cover 40. The object generally is to have as many characters as possible clearly displayed for ease in making up the message as well as for ease in stowage. Three, four or more sets of characters are preferable, particularly as to the sets of numbers. Phonetic spelling, using the alphabet characters, may be resorted to when short of alphabet letters. Numbers are significantly more important because they must be exact. By making the characters, whether they be alphabet characters or number characters, with a different color effect, they may be made to have greater prospect of being noticed and remembered. Plaque-like members 33 and the characters on them may also have a reflective character or other distinctive visual character to stimulate the recollection of a rapid passer-by who might be willing to assist.

When the plaque-like members are to be mounted upon the display panels, they are merely slid successively inwardly from one end of the panel or the other and appropriately spaced. In the alternative, the plaque-like members may be of flexible material so that they can be bent and placed in the grooves from the face side.

In the embodiment of the invention of FIG. 3, there is employed a rigid post 50 adapted to be mounted on a base 51 which, on occasion, may carry a magnet 52, thereby to provide a magnetic attachment to the vehicle where the top surface 13 is metallic. On this occasion, there is provided a sheet material 53 which also is metallic and of magnetic consistency. A hooking finger 54, anchored by a flange 55 to a rear face 56 of the sheet material, is extendible through a hole 57 in the post 50. Multiple holes may be provided at different levels, if preferred.

On this occasion plaque-like members 58 for carrying the characters, be they letters of the alphabet or numbers, are provided with magnetic strips 59 and 60. In order to promote proper alignment of the plaque-like members 58 on the sheet material 53, visible lines may be drawn to separate a front face 61 into spaced parallel display panels 62, 63, 64 and 65. In the alternative, the sheet material 53 may be of non-metallic material with lines of metallic material defining respective upper and lower edges of the display panels, in this way to assure that the plaque-like members 58 will be in alignment when displayed. Conventional metallic strip material is readily available in thin sheets and thin strips so that the plaque-like member for use by metallic attachment may be as compact for storage as well as display in a relatively small container like the container 35.

In still another form of plaque-like member 69, as shown in FIG. 6, there may be a face material 70 of special character, having a contrasting reflective or light-absorbing consistency to render it especially visible. The rear face of the face material may be provided with a releasable adhesive surface material 71. On this occasion, a sheet material such as that identified in FIG. 3 need be no more than a surface to which the adhesive temporarily adheres and from which the plaque-like member 69 can be removed when no longer needed. For storage in the container, an appropriate non-adhesive separator may be used.

Merely to illustrate some appropriate messages which may be displayed on the four-panel sheet material, the following are suggested:

---

CALL HUSBAND
273-8116
BRAKES FAILED
BETTY
BREAKDOWN
CALL TOW TRUCK
TRIPLE A
G. G. FABBER
NEED TIRE, NO SPARE
CALL OFFICE
818-980-5468
CHARLIE BARRY

---

Irrespective of the number of calls which might result from the plea, helpful assistance would be in prospect.

While particular embodiments of the present invention have been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is:

1. An emergency kit for temporary storage and subsequent display of selected visible messages when in assembled mounted condition on the exterior of a passenger carrying vehicle, said kit comprising a post means having a base member and an upright member for mounting on the base member, a mono-color display sheet comprising a single thickness of sheet material having a forward side and a rearward side, releasable engagement means on said display sheet having a releasable engagement with said post means in assembled condition for securing said display sheet on the post means in exposed display position, a plurality of substantially horizontally extending parallel retention bands on said forward side of the display sheet, a container and multiple sets of substantially flat message characters adapted to be stored in sequential visible order in said container, each of said characters having substantially the same perimetrical shape and size, a display face having a color different from the color of said display sheet, and a rear face, said display faces being in visible position during storage to facilitate selection, attachment media adjacent the rear face of each character comprising a mechanical interlock adapted to releasably engage portions of said retention bands in selected sequence whereby to display messages on the bands visible from a direction facing said forward side of the display sheet.

2. An emergency kit as in claim 1 wherein the forward side of said display sheet has spaces intermediate said bands wherein spaces are clear of said attachment media.

* * * * *